United States Patent [19]
Burns

[11] Patent Number: 5,936,015
[45] Date of Patent: Aug. 10, 1999

[54] RUBBER-MODIFIED ASPHALT PAVING BINDER

[75] Inventor: Bernard J. Burns, Huntingdon Valley, Pa.

[73] Assignee: Creanova Inc., Somerset, N.J.

[21] Appl. No.: 09/174,061

[22] Filed: Oct. 16, 1998

[51] Int. Cl.$^6$ .............................. C08L 95/00; C08J 11/06
[52] U.S. Cl. ................... 524/71; 524/59; 521/41
[58] Field of Search ................. 521/41; 524/59, 524/71

[56] References Cited

FOREIGN PATENT DOCUMENTS 4133979  4/1993  Germany ................... 524/71

*Primary Examiner*—Peter A. Szekely
*Attorney, Agent, or Firm*—Abelman, Frayne & Schwab

[57] ABSTRACT

An improved rubber-modified asphalt paving binder is provided by incorporating a minor proportion of a polyoctenamer into the heated liquid asphalt cement. The binder can contain from about 80% to about 99% by weight of asphalt cement, from about 0.5% to about 20% by weight of crumb rubber, such as ground tire rubber ("GTR"), and from about 0.01% to about 10% by weight of the polyoctenamer. The polyoctenamer can be of the trans- or cis- form, such as that sold under the brand name VESTENAMER®. A paving concrete is provided by adding the improved asphalt binder, with mixing, to conventional aggregate materials, which materials can also contain additional crumb rubber.

36 Claims, No Drawings

RUBBER-MODIFIED ASPHALT PAVING BINDER

FIELD OF THE INVENTION

The invention relates to asphalt, or bitumen, paving compositions that are modified by the addition of rubber, and particularly crumb rubber, such as ground tire rubber from discarded tires.

BACKGROUND OF THE INVENTION

Conventional asphalt cement (AC) produced by a petroleum refinery must be modified to enhance its qualities as a binder. Asphalt cement derived from petroleum refining is a mixture of hydrocarbons and heterocyclic compounds, including asphaltenes and maltenes formed from polynuclear hydrocarbons of relatively high molecular weight. Asphalt varies depending upon its source, i.e., the crude oil and the refinery. An asphalt binder is defined as the substance used to hold together the aggregate particles, e.g., crushed rock, stone, fillers, etc., and thereby form the asphalt concrete.

Various modifiers have been disclosed and adopted for commercial use in an effort to improve the performance and extend the life of asphalt paving compositions. One class of material that has been added to the hot asphalt are polymer modifiers. One commonly used polymer that is added to the asphalt at high temperature is styrene-butadiene-styrene (SBS) block co-polymer in a range that is typically less than 10% by weight of the asphalt binder mixture. Although certain physical properties and performance characteristics of the applied asphalt concrete are improved, the use of SBS has several drawbacks, including its insolubility in the asphalt and that it separates and rises to the top of the asphalt during storage unless the mixture is subjected to the appropriate type of mixing on a continuous basis. When used with GTR, the asphalt-SBS mixture is subject to an increase in viscosity during storage. A further drawback to the use of SBS as a modifier is that relatively higher levels of the polymer are required to achieve the same level of improvement in the federally-established Strategic Highway Research Program (SHRP) asphalt binder test ("PG") rating.

Polypropylene has also been used commercially as a modifier, but like SBS this material does not form a true solution with the asphalt and if the mechanical stirring and/or recirculation of the mixture is discontinued or drops below a certain level, the polymer additive will separate to form a separate layer on the surface of the hot asphalt in the processing equipment.

Another polymeric material that has been suggested for use as a modifier of asphalt is styrene-butadiene rubber (SBR). However, the modified asphalt containing SBR produces a composition having relatively high tack which results in an undesirable build-up of the material on paving machines' flights, hoppers, shovels and lutes. This effect is also manifested as a pick-up on the surface of the roller equipment when the hot concrete is being finished on the road surface which can only be mitigated by allowing the asphalt to cool to less than about 150° F. before being rolled. In addition, the finished paving concrete has a greater tendency to develop "spider webs", or fine surface cracks, under certain climatic conditions.

A variety of other polymers, including rubbery terpolymers, have been disclosed as having utility as asphalt modifiers. For example, U.S. Pat. No. 5,733,955 discloses the addition of a rubbery polymer as a modifier that is comprised of a conjugated diolefin monomer, a vinyl aromatic monomer, and isobutoxymethyl acrylamide that form the backbone of the polymer. An asphalt modifier is disclosed in U.S. Pat. No. 5,773,496, that is a mixture of sulphur and a polymer comprised of a linear co-polymer that is a styrene-conjugated diene block co-polymer and a similar linear co-polymer of specified molecular weight. It does not appear that these or other polymeric modifiers have been adopted for use by commercial paving contractors.

A material that has been adopted for use as an asphalt cement modifier is crumb rubber. The principal source of crumb rubber in the United States and elsewhere throughout the world is ground tire rubber (GTR) from discarded tires. The U.S. Federal Highway Administration (FHWA) has approved crumb rubber produced from scrap tires for use in highway pavements as a modifier for asphalt cement. The use of crumb rubber as a modifier for asphalt cement in place of other "virgin" polymeric modifiers has been hailed by some as a solution to the ever-growing problem of disposing of discarded tires in an ecologically acceptable and economical way.

Crumb rubber, or GTR, of varying particle sizes has been incorporated into the hot asphalt cement, although relatively small particle sized materials of 40 mesh or smaller are preferred. Two basic types of crumb rubber are available and are identified by the processes for their respective manufacture. Cryogenic GTR is produced by shredding the tire into relatively large pieces and then subjecting the rubber to grinding under cryogenic conditions. Ambient or warm-ground GTR is produced under non-cryogenic conditions. The cryogenic GTR exhibits a certain regularity of shape when examined by scanning electron microscope (SEM) techniques and reveals particles having generally planar surfaces of relatively low surface area, as might be expected from the fracturing of the cryogenically frozen crystalline tire rubber. In contrast, ambient GTR particles are irregular in appearance with extended tendrils resulting from the pulling apart and shredding of the rubber structure (as compared to cryogenic fracturing) and possess a much higher surface area as compared to the particles produced by the cryogenic process.

The use of GTR as a modifier for asphalt cement that is used as a binder in paving compositions provides several advantages, including a more resilient road surface that flexes under the force of passing vehicular traffic to break up thin sheets of ice during formation. The road surface is also darker and therefore absorbs more of the sun's radiant energy to melt accumulating ice and to more quickly dry a wet surface. The addition of GTR also provides improved skid resistance. However, there are limited opportunities for a chemical bond to form between the asphaltenes and maltenes and the rubber particles and it is difficult to uniformly disperse the GTR in the asphalt cement. As a result of these chemical and physical limitations, finished pavement containing GTR is still subject to rutting under continuous traffic and/or heavy loads, and also to shoveling in areas of braking and rapid acceleration.

It is therefore an object of the present invention to provide an improved rubber modified asphalt paving binder that enhances the performance characteristics of asphalt paving compositions containing crumb rubber or GTR.

Another object of the invention is to provide an improved process for the manufacture of rubber modified asphalt paving binders.

It is also an important object of the invention to provide an improved process and composition for roadway pavements that will foster the widespread adoption and use of GTR from discarded tires and thereby advance the recycling of discarded tires to resolve a major environmental and ecological problem in the United States and elsewhere throughout the world.

A further object of the invention is to provide an improved rubber modified asphalt paving composition that can be produced in existing asphalt mixing equipment and paving machines.

Another object of the invention is to provide an asphalt binder having enhanced properties due to cross-linking that will produce a superior asphalt concrete when applied to poorly prepared subsurfaces.

It is yet another object of the invention to provide an improved rubber modified asphalt paving binder that employs commercially available polymeric modifiers and that is more economical to produce and apply than currently used polymeric modifiers and additives.

SUMMARY OF THE INVENTION

In accordance with the invention, an improved rubber modified asphalt paving binder is comprised of from about 80% to about 99% by weight of asphalt cement, from about 0.5% to about 20% by weight of crumb rubber, and from about 0.01% to about 10% by weight of polyoctenamer. In a preferred embodiment of the invention, the modified asphalt paving binder is comprised of from about 80% to about 95% of the asphalt cement, from about 2% to about 15% of the crumb rubber and from about 0.2% to about 5% of the polyoctenamer. It has been found that the above objects, and other advantages are realized by the incorporation of a minor proportion of a polyoctenamer into the heated liquid asphalt cement. The polyoctenamer is added in a dry particulate form to the molten asphalt cement at a temperature of about 325° F., the mixture being stirred or otherwise agitated (as by recirculating pumps) until the polyoctenamer is dissolved and thoroughly mixed. The crumb rubber can be added to the hot asphalt cement with the polyoctenamer pellets or after the polyoctenamer pellets have been dispersed and before or after they have been melted and mixed.

The polyoctenamer is a cyclic macromolecule having a crystalline structure exhibiting a low viscosity above its melting point. The macromolecule has a high proportion of double bonds which permits cross-linking and provides a rubbery polymer. Importantly, when the polyoctenamer is melted it has a viscosity and tackiness comparable to honey. These properties of the melted material assist in the mixing of the GTR in the asphalt cement. Its large number of double bonds allows the polyoctenamer to react with available sites e.g., sulfur of the asphalt constituents, and particularly the asphaltenes and maltenes, while leaving a large number of sites available for reaction with the sulfur at the surface of the GTR or crumb rubber that forms the other major component of the binder composition. Once cooled and cross-linked, the polyoctenamer has no tack and reduces the tack of the GTR/asphalt binder so there is little pickup of asphalt from the road surface allowing the road to be rolled much sooner and while it is still hot.

A suitable polyoctenamer is available from Hüls AG of Marl, Germany, and through its distributor in the U.S., Creanova Inc. of Somerset, N.J., under the trademark VESTENAMER®. The preferred form of the polyoctenamer is trans-polyoctenamer, which is also preferred to as "trans-octenamer rubber" (TOR). Two grades of the VESTENAMER® trans-polyoctenamer polyoctenamer are commercially available: "8012" identifies a material having a trans-content of approximately 129° F. 80% (and a cis-content of 20%) with a melting point of approximately 54° C.; and 6213 having a trans-content of approximately 60% (cis- content of 40%) with a melting point of approximately 86° F./30° C. Both of these polymers have a double bond at every eighth carbon atom in the ring. The preferred form of the TOR for use in the practice of the invention has a transcontent of approximately 80%. However, compounds having other ratios of the cis- and trans-isomeric forms of the polyoctenamer can also be obtained by blending available products for use in the invention. Compounds of this class can be produced in accordance with the teachings of U.S. Pat. No. 3,804,803.

In a preferred embodiment of the invention, the GTR and the polyoctenamer are added to the hot liquified asphalt cement (AC) that is maintained at a temperature in the range from about 280° F. to about 350° F. The preferred temperature is about 320° F. to about 350° F., and will be dependent upon the qualities and characteristics of the asphalt cement, which as previously explained, can vary with the source.

In a preferred embodiment, the asphalt cement and GTR are maintained at the prescribed temperature range until a homogenous composition is obtained. In many existing field installations, the mixing is often provided by one or more recirculation pumps in the AC heating tank. In a most preferred embodiment of the process, mixing is by low shear rotating blades, paddles or the like which result in a more uniform distribution of the dry and wet materials in the viscous asphalt cement. Mixing is continued for about 30 minutes to about two hours. During the mixing, the polyoctenamer is melted and the double bonds begin to react with the sulfur in the asphalt cement and the sulfur at the surface of the GTR. In view of this surface effect, it is desirable to provide the GTR in a form that has as high as surface area as possible.

After the AC and the GTR or other crumb rubber have been mixed, the dry polyoctenamer is added and the mixing is continued. In the preferred practice of the invention, the GTR is added by dispensing the free-flowing material in the AC while the AC is being circulated and/or otherwise mixed to facilitate the coating of the GTR particles by the asphalt cement. Thereafter, the polyoctenamer is also added in a dry form and mixing continues while the material dissolves to form a solution with the AC. In this way, the double bonds of the polyoctenamer will react with and cross-link the sulfur and other reactive sites on the surface of the GTR. Thus, as presently understood, the process and composition of the invention provides a superior asphalt binder by enhancing the cross-linking of the asphaltenes, and other reactive sites of the AC with those of the GTR by means of the large numbers of double bonds available on the polyoctenamer, i.e., at every eighth carbon atom.

The preferred form of crumb rubber is ground tire rubber produced by the so-called warm or ambient grinding procedure. The shredding and pulling apart of the tire rubber at ambient temperatures produces irregular particles having a high surface area which desirably increases the number of reactive sites available for bonding or cross-linking with the polyoctenamer. There are many sources of GTR and the material can be used in the vulcanized or a devulcanized form. Devulcanized GTR produced by either an oxidative or reductive process can be used. The graded material having particle sizes that will pass 20 mesh to 80 mesh screens are preferred for practicing the invention. However, any GTR having particle sizes smaller than about 10 mesh can be used.

Various types or grades of GTR are available and have utility in the practice of the invention. For example, conventional automobile passenger tires are formulated by their manufacturers to exhibit certain road handling and comfort characteristics. Truck tires and tires for off-the-road vehicles require different characteristics, and are therefore formulated differently.

The aggregate used to prepare the asphalt concrete can be one or a mixture of the various standard aggregates used in the art, including gravel, crushed rock, stone, quarry gravel and recycled paving material. Another source of crumb rubber suitable for use in the composition is ground industrial waste rubber. These materials can be produced by either ambient grinding or cryogenic grinding. The materials can be mixed to achieve desired properties and to meet specifications.

In order to enhance certain performance specifications, additives can be incorporated in the asphalt binder composition of the invention. It has been found that mineral oil can be added to an asphalt binder of the invention prepared generally in accordance with the above description to maintain the PG value within an acceptable range.

DETAILED DESCRIPTION OF THE PREFERRED EMBODIMENT

Highway paving compositions employing the improved asphalt paving binder of the invention will be described. In the general practice of the method, an asphalt cement meeting federal highway specifications is added to a heated 10,000 gallon mixing tank at an asphalt terminal or to a recirculating asphalt tanker at the asphalt concrete plant. The asphalt cement is maintained at a temperature in the range from 280° to 350° F., with the average temperature being at the upper end of the range; i.e., 320° F. to 340° F. The asphalt cement is circulated by means of a recirculating pump and/or supplemental mechanical mixing means. In order to facilitate the mixing of the additional ingredients, the heated terminal tank can also be provided with auxiliary agitation in the form of an off-center mounted double propeller or the like. For adding additional ingredients at the asphalt concrete plant the other ingredients (GTR, polyoctenamer) are added to the Pug mill with the aggregate and asphalt cement which can contain a GTR band.

The following illustrate typical compositions utilizing representative forms of ground rubber and rubber particles. As will be apparent to one of ordinary skill in the art, the specific proportions and ingredients can be varied to meet local specifications, climatic and other specific conditions.

EXAMPLE 1

As asphalt paving binder is prepared by heating 91.5 parts of 58-28 asphalt cement to a temperature in the range of 280° to 320° F. and adding, with continuous mixing 8 parts of 80 mesh reground passenger tire rubber (GTR). Mixing is continued for about 2 hours until a uniform blend is obtained. Mixing is continued and 0.5 parts of 80% trans-polyoctenamer (VESTENAMER® 8012) is added with mixing for about 30 minutes until it is dissolved in the asphalt. Thereafter, 6 parts of this asphalt binder is added to 94 parts of a standard stone aggregate in a conventional or vertical drum batch production mixer to produce the asphalt concrete. The asphalt concrete is then applied to a suitably prepared sub-surface using standard paving techniques to provide a road surface having improved resistance to rutting and shoveling and to the formation of thin ice sheets.

EXAMPLE 2

An asphalt paving binder is prepared by heating 80 parts of 58-28 asphalt cement to a temperature in the range of 280° to 350° F. and 18 parts of 40 mesh ground truck tire rubber. Mixing is continued for about 3 hours until a uniform blend is obtained. Mixing is continued and 2 parts of 60% trans-polyoctenamer (VESTENAMER® 6213) is added with mixing for about 30 minutes until it is dissolved in the asphalt. The blended asphalt binder is transferred from the mixer into an insulated truck for transport to the paving site, which is at a location remote from the mixing plant. Thereafter, 8 parts of this asphalt binder is mixed with 92 parts of a standard aggregate in the hopper of a paving spreader machine to produce asphalt concrete which is applied to an appropriately prepared road surface.

EXAMPLE 3

An asphalt paving binder is prepared by heating 99 parts of 50-30 asphalt cement to a temperature in the range of 280° to 350° F. and 0.9 parts of cryogenically ground industrial waste rubber. Mixing is continued for about 1 hour until a uniform blend is obtained. Thereafter, 0.1 parts of 80% trans-polyoctenamer (VESTENAMER® 8012) is added with continuous mixing for about 15 minutes until it is dissolved in the asphalt to form the binder. Thereafter, 7 parts of this asphalt binder is mixed with an aggregate blend formed from 90 parts of quarry gravel and 3 parts of recycled glass in a universal mixer to produce asphalt concrete which is then applied in a thickness of about two inches to resurface an appropriately prepared road surface.

EXAMPLE 4

An asphalt paving binder is prepared by heating 80 parts of 64-18 asphalt cement to a temperature in the range of 280° to 350° F. and adding with continuous mixing 10 parts of ambient ground off-the-road tires. After mixing for about 1.5 hours to obtain a uniform blend, 10 parts of 80% trans-polyoctenamer (VESTENAMER® 8012) is added and mixed for an additional period of about 1.5 hours until it is dissolved in the asphalt to form the binder. Thereafter, 10 parts of this asphalt binder is added to a blend of 80 parts gravel and 10 parts of 10 mesh ground tire rubber in a vertical mixer to produce asphalt cement. The resulting asphalt cement is transferred to a truck for transport to the paving site where it is spread on a graded subsurface and rolled to provide a parking lot and access roadways.

EXAMPLE 5

A highway paving composition is prepared employing the following aggregate mix:

| Ingredient | Screen* (inch) | Amount (lbs) |
| --- | --- | --- |
| Sand | 1/4 | 2450 |
| #2 Gravel | 3/8 | 620 |
| #3 Gravel | 3/16 | 950 |
| #4 Gravel | 1/16 | 630 |

*Material will pass a sieve with openings of indicated size

The aggregate, totalling 4650 pounds, is transported from outdoor storage hoppers via a flexible conveyor belt system into a heated drum mixer with a horizontal screw that is maintained at a temperature of about 300° F. to 400° F. to drive off any moisture. The dried aggregate is discharged at a temperature of about 340°–350° F.

The heated aggregate is discharged into a Pug mill having a pair of counter-rotating blades that is oil-heated and maintained at about 340° F. Thereafter, forty pounds of #10 GTR and three (3) pounds of Vestenamer® 8012 trans-polyoctenamer are added to the Pug mill and mixed for about 5–10 seconds at about 90 rpm.

Next, about 350 pounds of a mixture of 7% GTR in asphalt cement at about 340° F. is added to the Pug mixer. After mixing for about 30–35 seconds, the asphalt concrete is transferred to a truck for transport to the paving site where it is promptly transferred to the hopper of a paving spreader. The paving composition is advanced from the hopper and further mixed by a 12-inch screw conveyor that moves it forward to the spreader section. A pair of counter-rotating 6-inch screw conveyors uniformly distribute the asphalt concrete along the front section of the spreader where it is deposited on the prepared roadway substrate. The temperature of the paving composition as deposited is about 270° F. and about one hour has passed since the initial mixing of the polyoctenamer with the GTR/asphalt cement.

After deposit of the paving composition of the invention, compression with paving rollers was commenced and proceeded for approximately thirty minutes to finish the paving on a section of roadway using this batch of asphalt concrete. The temperature of the compacted road surface during this operation exceeded 150° F. During the rolling operation, it was noted that the surface of the composition of the invention had significantly decreased "pick-up" on the rolling equipment as compared to GTR asphalt concrete without the polyoctenamer. The hot asphalt concrete could be rolled much sooner than the prior art composition, which must be allowed to cool down in order to reduce the pick-up of material from the paving surface. It was also observed that the paving composition was easily discharged from the truck into the paving machine and that the material did not stick to the surfaces of the spreader or lands of the various screw conveyors with which it came into contact.

Based on the evaluation of economic data an asphalt binder composition in accordance with the invention can provide superior performance characteristics at a substantial cost savings, as compared to a binder modified with SBS. These advantages include more uniform mixing of the ingredients, reduction of tack of the rubberized asphalt which reduces road surface pickup (asphalt clinging to the heated roller cylinders), faster paving (the rollers can get onto the hot surface faster) which also gives a better finished composition to the roadway. The invention thus can provide the advantages of a superior road surface for less money, thereby allowing either an increase in the paved miles within the budget authorized, or a savings in the project cost.

I claim:

1. An asphalt paving binder comprised of:
    (a) from about 80% to about 99% by weight of asphalt cement;
    (b) from about 0.5% to about 20% by weight of crumb rubber, and
    (c) from about 0.01% to 10% by weight of polyoctenamer.

2. The asphalt paving binder of claim 1 comprised of:
    (a) from about 80% to about 95% by weight of asphalt cement;
    (b) from about 2% to 15% by weight of crumb rubber; and
    (c) from about 0.2% to 5% by weight of polyoctenamer.

3. The asphalt paving binder of claim 1 where the polyoctenamer is a trans-polyoctenamer rubber.

4. The asphalt paving binder of claim 3 where the trans-polyoctenamer rubber has a melting point of approximately 129° F.

5. The asphalt paving binder of claim 3 where the trans-polyoctenamer has approximately 80% of its bond in the trans-position.

6. The asphalt paving binder of claim 3 where the trans-polyoctenamer has a melting point of approximately 86° F.

7. The asphalt paving binder of claim 3 where the trans-polyoctenamer has approximately 60% of its double bonds in the trans-position.

8. A process for the manufacture of an asphalt paving binder composition comprising:
    a) heating asphalt cement to a temperature in the range from about 280° F. to about 350° F.;
    b) adding to the heated asphalt cement from about 0.5 weight percent to about 20 weight percent, based on the total weight of the binder composition, of crumb rubber and from about 0.01 to about 10 weight percent, based on the total weight of the binder composition of polyoctenamer; and
    c) mixing the asphalt cement, crumb rubber and polyoctenamer until the polyoctenamer dissolves to form a homogeneous binder composition.

9. The process of claim 8 where the temperature of the composition is maintained in the range from about 280° to about 350° F. during the mixing of step (c).

10. The process of claim 8 where the mixing of step (c) is continued for from about 30 minutes to about three hours.

11. The process of claim 8 where the polyoctenamer is dissolved in the heated asphalt cement after the crumb rubber is added.

12. The process of claim 8 where the polyoctenamer has a melting point of about 129° F.

13. The process of claim 8 where the crumb rubber is ground tire rubber.

14. The process of claim 13 where the ground tire rubber is derived from tires ground at ambient temperatures.

15. The process of claim 13 where the ground tire rubber is of a particle size that will pass a 40 mesh screen.

16. The process of claim 8 which includes the further step of adding performance enhancing additives to the binder composition.

17. The process of claim 8 in which the binder composition is mixed by passing the composition through a recirculating pump.

18. A process for the manufacture of an asphalt concrete paving composition comprising an asphalt binder and aggregate material, the process comprising the steps of:
    a) heating asphalt cement to a temperature in the range from about 280° F. to about 350° F.;
    b) adding to the heated asphalt cement from about 0.5 weight percent to about 20 weight percent, based on the total weight of the binder composition, of crumb rubber and from about 0.01 to about 10 weight percent, based on the total weight of the binder composition of polyoctenamer; and
    c) mixing the asphalt cement, crumb rubber and polyoctenamer until the polyoctenamer dissolves to form a homogeneous binder composition.
    d) combining the heated binder composition and aggregate material;
    e) mixing the binder composition and the aggregate material to uniformly coat the aggregate material with the hot binder composition to form a homogeneous asphalt concrete paving composition.

19. The process of claim 18 where the mixing of step (e) is part of a substantially continuous process.

20. The process of claim 19 where the mixing of step (e) occurs in the hopper of a paving spreader machine.

21. The process of claim 20 where the aggregate material comprises recycled paving material.

22. The process of claim 18 where the mixing of step (e) occurs in a vertical batch production mixer.

23. The process of claim 18 where steps (a)–(c) are performed at a location remote from the location at which steps (d) and (e) are performed, and the process comprises the further step of transporting the asphalt binder in an insulated tank to the remote location.

24. A paving composition comprising an asphalt binder and mineral aggregate, where the asphalt binder is comprised of asphalt cement, polyoctenamer and crumb rubber.

25. The paving composition of claim 24 where the polyoctenamer is a trans-polyoctenamer having about 80% of its double bonds in the trans-position and a melting point of about 129° F.

26. The paving composition of claim 24 further comprising graded particles of ground rubber that will pass a 10 mesh screen and be held by a 20 mesh screen.

27. A paved surface comprising an asphalt binder and mineral aggregate, where the asphalt binder is comprised of asphalt cement, polyoctenamer and crumb rubber.

28. The paved surface of claim 27 where the polyoctenamer is a trans-polyoctenamer having about 80% of its double bonds in the trans-position and a melting point of about 129° F.

29. Method of increasing the compatibility of crumb rubber and asphalt cement in an asphalt binder composition which comprises adding to the composition from about 0.01 to about ten weight percent of polyoctenamer, based on the total weight of the asphalt binder composition.

30. The method of claim 29 where the crumb rubber is ground tire rubber.

31. The method of claim 30 where the ground rubber is comprised of particles that will pass a 40 mesh screen.

32. The method of claim 29 where the crumb rubber comprises from about 0.5 to about 20 weight percent, based on the weight of the asphalt binder composition.

33. The method of claim 29 where the polyoctenamer is an isomeric mixture that is about 80% trans-polyoctenamer and about 20% cis-polyoctenamer.

34. The method of claim 29 where the polyoctenamer is mixed in melted asphalt cement prior to the addition of the crumb rubber.

35. The method of claim 29 where the asphalt binder composition is prepared by mixing asphalt cement, trans-polyoctenamer and ground tire rubber at a temperature in the range from about 280° F. to about 350° F. for a predetermined time ranging from about 30 minutes to about two hours.

36. The method of claim 35 where the time is sufficient to permit substantial cross-linking between the polyoctenamer and the asphalt cement and ground tire rubber.

* * * * *

UNITED STATES PATENT AND TRADEMARK OFFICE
CERTIFICATE OF CORRECTION

PATENT NO. : 5,936,015
DATED : August 10, 1999
INVENTOR(S) : Bernard J. Burns

It is certified that error appears in the above-identified patent and that said Letters Patent is hereby corrected as shown below:

Claim 16, line 2, after "adding", delete "performance enhancing additives" and insert --mineral oil--.

Signed and Sealed this

Tenth Day of October, 2000

*Attest:*

Q. TODD DICKINSON

*Attesting Officer*     *Director of Patents and Trademarks*